(12) United States Patent
Choi et al.

(10) Patent No.: US 7,301,063 B2
(45) Date of Patent: Nov. 27, 2007

(54) PROCESS FOR INCREASING PRODUCTION OF LIGHT OLEFIN HYDROCARBON FROM HYDROCARBON FEEDSTOCK

(75) Inventors: Sun Choi, Daejeon (KR); Seung Hoon Oh, Seoul (KR); Kyoung Hak Sung, Daejeon (KR); Jong Hyung Lee, Daejeon (KR); Sin Choel Kang, Seoul (KR); Yong Seung Kim, Daejeon (KR); Byeung Soo Lim, Daejeon (KR); Ahn Seop Choi, Seoul (KR); Byoung Mu Chang, Daejeon (KR)

(73) Assignee: SK Corporation, Seoul (KR)

( * ) Notice: Subject to any disclaimer, the term of this patent is extended or adjusted under 35 U.S.C. 154(b) by 253 days.

(21) Appl. No.: 11/225,575

(22) Filed: Sep. 12, 2005

(65) Prior Publication Data

US 2006/0287561 A1 Dec. 21, 2006

(30) Foreign Application Priority Data

Jun. 21, 2005 (KR) ...................... 10-2005-0053618

(51) Int. Cl.
*C07C 1/00* (2006.01)

(52) U.S. Cl. ...................... 585/324; 585/319; 585/489; 585/475; 208/137; 208/111.1; 208/111.35

(58) Field of Classification Search ................ 585/324, 585/319, 189, 475; 208/137, 111.1, 111.35
See application file for complete search history.

(56) References Cited

U.S. PATENT DOCUMENTS 3,928,174 A * 12/1975 Bonacci et al. ............... 208/80
6,635,792 B2 10/2003 Choi et al.

* cited by examiner

*Primary Examiner*—Thuan Dinh Dang
(74) *Attorney, Agent, or Firm*—Darby & Darby P.C.

(57) ABSTRACT

A process for increasing the production of light olefin hydrocarbons from a hydrocarbon feedstock. A process for producing an aromatic hydrocarbon mixture and liquefied petroleum gas (LPG) from a hydrocarbon mixture, and a process for producing a hydrocarbon feedstock which is capable of being used as a feedstock in the former process, that is to say, a fluidized catalytic cracking (FCC) process, a catalytic reforming process, and/or a pyrolysis process, are integrated, thereby it is possible to increase the production of $C_2$-$C_4$ light olefin hydrocarbons.

16 Claims, 3 Drawing Sheets

PROCESS FOR INCREASING PRODUCTION OF LIGHT OLEFIN HYDROCARBON FROM HYDROCARBON FEEDSTOCK

INCORPORATION BY REFERENCE

The present application claims priority under 35 U.S.C. §119 to Korean Patent Application No. 10-2005-0053618 filed on Jun. 21, 2005. The content of the application is incorporated herein by reference in its entirety.

BACKGROUND OF THE INVENTION

1. Field of the Invention

The present invention relates to a process for increasing the production of light olefin hydrocarbons from a hydrocarbon feedstock. More particularly, the present invention pertains to a process for increasing the production of $C_2$-$C_4$ light olefin hydrocarbons by integrating a process for producing an aromatic hydrocarbon mixture and liquefied petroleum gas (LPG) from a hydrocarbon mixture and a process for producing a hydrocarbon feedstock which is capable of being used as a feedstock in the former process.

2. Description of the Related Art

Generally, naphthas, pyrolysis gasolines which are reaction products of a pyrolysis process, reformates which are reaction products of a catalytic reforming process, and fluidized catalytic cracking gasolines which are reaction products of a fluidized catalytic cracking process are used as feedstocks in processes for producing an aromatic hydrocarbon mixture and/or LPG from a hydrocarbon mixture.

In connection with this, the pyrolysis process is a process for producing basic petrochemical materials, such as ethylene and propylene, as main products from naphthas as a fraction. In this process, a fraction which is rich in aromatic compounds, such as pyrolysis gasolines, is produced as a byproduct.

In the catalytic reforming process, gasolines, benzene, toluene, xylene, and $C_9$+ (compounds having 9 or more carbons) aromatic hydrocarbons are produced from naphthas, as a feedstock, that are heavier than those of the pyrolysis process, and a fraction which is rich in aromatic components is also produced.

Furthermore, in the fluidized catalytic cracking process, a gasoline fraction, which is rich in ethylene, propylene, and aromatic components, is produced from a feedstock that is heavier than that of the catalytic reforming process.

When an independent process for producing an aromatic hydrocarbon mixture and/or LPG is conducted using the above-mentioned pyrolysis gasolines, reformates, and/or fluidized catalytic cracking gasolines as feedstock oil, production of the LPG is conducted in conjunction with production of aromatics, thus a large portion of the imported LPG can be substituted with LPG generated as a byproduct in an area where most of the LPG is imported, such as Korea. However, there is a disadvantage in that hydrogen is used in a large amount because purge gas, which has a high content of hydrogen generated in the process, is used as a fuel in the process. Therefore, there remains a need for a process for increasing the utility of a non-aromatic carbon compound, which is rich in LPG and produced through a catalytic reaction, and reducing the amount of hydrogen used.

SUMMARY OF THE INVENTION

Leading to the present invention, the intensive and thorough research on production of light olefin hydrocarbon, carried out by the present inventors aiming to avoid the problems encountered in the prior arts, resulting in the finding that, when a process for producing an aromatic hydrocarbon mixture and LPG from a hydrocarbon mixture and a process for producing a hydrocarbon feedstock which is capable of being used as a feedstock of the former process are integrated, it is possible to improve the productivity and efficiency of each process or of the overall process, thereby accomplishing the present invention.

Therefore, it is an object of the present invention to provide a process for increasing the production of light olefin hydrocarbons by improving the productivity and efficiency of a process for producing an aromatic hydrocarbon mixture and LPG from a hydrocarbon mixture, a process for producing a hydrocarbon feedstock which is capable of being used as a feedstock in the former process, or the combined processes.

It is another object of the present invention to provide a process for recovering residual hydrogen after non-aromatic hydrocarbon compounds are hydrogenated in the presence of a catalyst.

It is still another object of the present invention to provide a process for producing a mixture, which is rich in an LPG component and generated in the course of hydrogenating non-aromatic hydrocarbon compounds of feedstock oil in the presence of a catalyst, in an LPG separating column of a process of producing a feedstock oil without an additional LPG separating column.

It is yet another object of the present invention to provide a process for using ethane and an LPG component, which are generated in the course of hydrogenating non-aromatic hydrocarbon compounds of the feedstock oil in the presence of a catalyst, as a process fuel and a feedstock for a pyrolysis process.

In accordance with an embodiment of the present invention, there is provided a process for increasing the production of a light olefin hydrocarbon compound from a hydrocarbon feedstock, including the following steps of:

feeding a hydrocarbon feedstock into a pyrolysis furnace to conduct a pyrolysis reaction;

separating reaction products, which are generated from the pyrolysis reaction, into a stream containing hydrogen and $C_4$ or lower hydrocarbons, and a stream containing $C_5$+ hydrocarbons, through a compression and fractionation process;

recovering the hydrogen, and the $C_2$, $C_3$ and $C_4$ olefin and paraffin hydrocarbons, respectively from the stream containing the hydrogen and the $C_4$ or lower hydrocarbons;

separating pyrolysis gasolines and a $C_9$+ hydrocarbon-containing fraction from the stream containing the $C_5$+ hydrocarbons, using hydrogenation and separation processes;

feeding a mixture of the separated pyrolysis gasolines, a hydrocarbon feedstock, and hydrogen into at least one reaction area;

converting the mixture in the presence of a catalyst in the reaction area into an aromatic hydrocarbon compound which is rich in benzene, toluene, and xylene through dealkylation/transalkylation reactions, and into a non-aromatic hydrocarbon compound which is rich in liquefied petroleum gas through a hydrocracking reaction;

separating reaction products of the converting step into an overhead stream, which contains hydrogen, methane, ethane, and liquefied petroleum gas, and a bottom stream, which contains aromatic hydrocarbon compounds, and a small amount of hydrogen and non-aromatic hydrocarbon compounds, using a gas-liquid separation process;

circulating the overhead stream into the compression and fractionation process; and recovering the aromatic hydrocarbon compounds from the bottom stream.

The process may further comprise circulating at least a portion of the $C_2$-$C_4$ paraffin hydrocarbons which are respectively recovered in the hydrogen and $C_4$ or lower hydrocarbon recovering step into the pyrolysis furnace.

Meanwhile, in the overhead circulating step a portion of the overhead stream may be separated and then recycled into the reaction area of the hydrocarbon feedstock converting step, or the entire overhead stream may be recycled into the compression and fractionation process.

Furthermore, the process may further comprise separating the aromatic hydrocarbon compounds which are recovered in the aromatic hydrocarbon recovering step into benzene, toluene, xylene, and $C_9$+ aromatic compounds, respectively.

Preferably, 10-95 wt % zeolite, which is at least one selected from a group consisting of mordenite, a beta type of zeolite, and a ZSM-5 type of zeolite and which has a silica/alumina molar ratio of 200 or less, is mixed with 5-90 wt % inorganic binder to produce a support, and platinum/tin or platinum/lead is supported on the mixture support to produce the catalyst of the hydrocarbon feedstock converting step.

Meanwhile, the hydrocarbon feedstock may be selected from a group consisting of reformate, pyrolysis gasoline, fluidized catalytic cracking gasoline, $C_9$+ aromatic-containing mixture, naphtha, and a mixture thereof.

According to another embodiment of the present invention, there is provided a process for increasing the production of a light olefin hydrocarbon compound from a hydrocarbon feedstock, including the following steps of:

feeding a hydrocarbon feedstock into a pyrolysis furnace to conduct a pyrolysis reaction;

separating reaction products, which are generated from the pyrolysis reaction, into a stream containing hydrogen and $C_4$ or lower hydrocarbons, and a stream containing $C_5$+ hydrocarbons, through a compression and fractionation process;

recovering the hydrogen, and the $C_2$, $C_3$ and $C_4$ olefin and paraffin hydrocarbons from the stream containing the hydrogen and the $C_4$ or lower hydrocarbons;

separating pyrolysis gasolines and a $C_9$+ hydrocarbon-containing fraction from the stream containing the $C_5$+ hydrocarbons, using hydrogenation and separation processes;

feeding a mixture of the separated pyrolysis gasolines, a hydrocarbon feedstock, and hydrogen into at least one reaction area;

converting the hydrocarbon feedstock in the presence of a catalyst in the reaction area into an aromatic hydrocarbon compound which is rich in benzene, toluene, and xylene through dealkylation/transalkylation reactions, and into a non-aromatic hydrocarbon compound which is rich in liquefied petroleum gas through a hydrocracking reaction;

separating reaction products of the hydrocarbon feedstock converting step into an overhead stream, which contains hydrogen, methane, ethane, and liquefied petroleum gas, and a bottom stream, which contains aromatic hydrocarbon compounds, and a small amount of hydrogen and non-aromatic hydrocarbon compounds, using a gas-liquid separation process;

circulating the overhead stream into the compression and fractionation process;

separating the bottom stream into a stream containing the aromatic hydrocarbon compounds and a stream containing a small amount of hydrogen and non-aromatic hydrocarbon compounds; and circulating the stream, which is separated in the bottom stream separating step and contains a small amount of hydrogen and non-aromatic hydrocarbon compounds, into the pyrolysis furnace.

According to still another embodiment of the present invention, there is provided a process for increasing the production of a light olefin hydrocarbon compound from a hydrocarbon feedstock including the following steps of:

feeding a hydrocarbon feedstock into a pyrolysis furnace to conduct a pyrolysis reaction;

separating reaction products, which are generated from the pyrolysis reaction, into a stream containing hydrogen and $C_4$ or lower hydrocarbons, and a stream containing $C_5$+ hydrocarbons, through a compression and fractionation process;

recovering the hydrogen, and the $C_2$, $C_3$ and $C_4$ olefin and paraffin hydrocarbons from the stream containing the hydrogen and the $C_4$ or lower hydrocarbons;

introducing fluidized catalytic cracking gasolines to the stream containing the $C_5$+ hydrocarbons, and separating pyrolysis gasolines and a $C_9$+ hydrocarbon-containing fraction from the resulting stream using hydrogenation and separation processes;

feeding a mixture of the separated pyrolysis gasolines, a hydrocarbon feedstock, and hydrogen into at least one reaction area;

converting the hydrocarbon feedstock in presence of a catalyst in the reaction area into an aromatic hydrocarbon compound which is rich in benzene, toluene, and xylene through dealkylation/transalkylation reactions, and into a non-aromatic hydrocarbon compound which is rich in liquefied petroleum gas through a hydrocracking reaction;

separating reaction products of the hydrocarbon feedstock converting step into an overhead stream, which contains hydrogen, methane, ethane, and liquefied petroleum gas, and a bottom stream, which contains aromatic hydrocarbon compounds, and a small amount of hydrogen and non-aromatic hydrocarbon compounds, using a gas-liquid separation process;

circulating the overhead stream into the compression and fractionation process;

separating the bottom stream into a stream containing the aromatic hydrocarbon compounds and a stream containing a small amount of hydrogen and non-aromatic hydrocarbon compounds; and circulating the stream, which is separated in the bottom stream separating step and contains a small amount of hydrogen and non-aromatic hydrocarbon compounds, into the pyrolysis furnace.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE INVENTION

Figure 1:
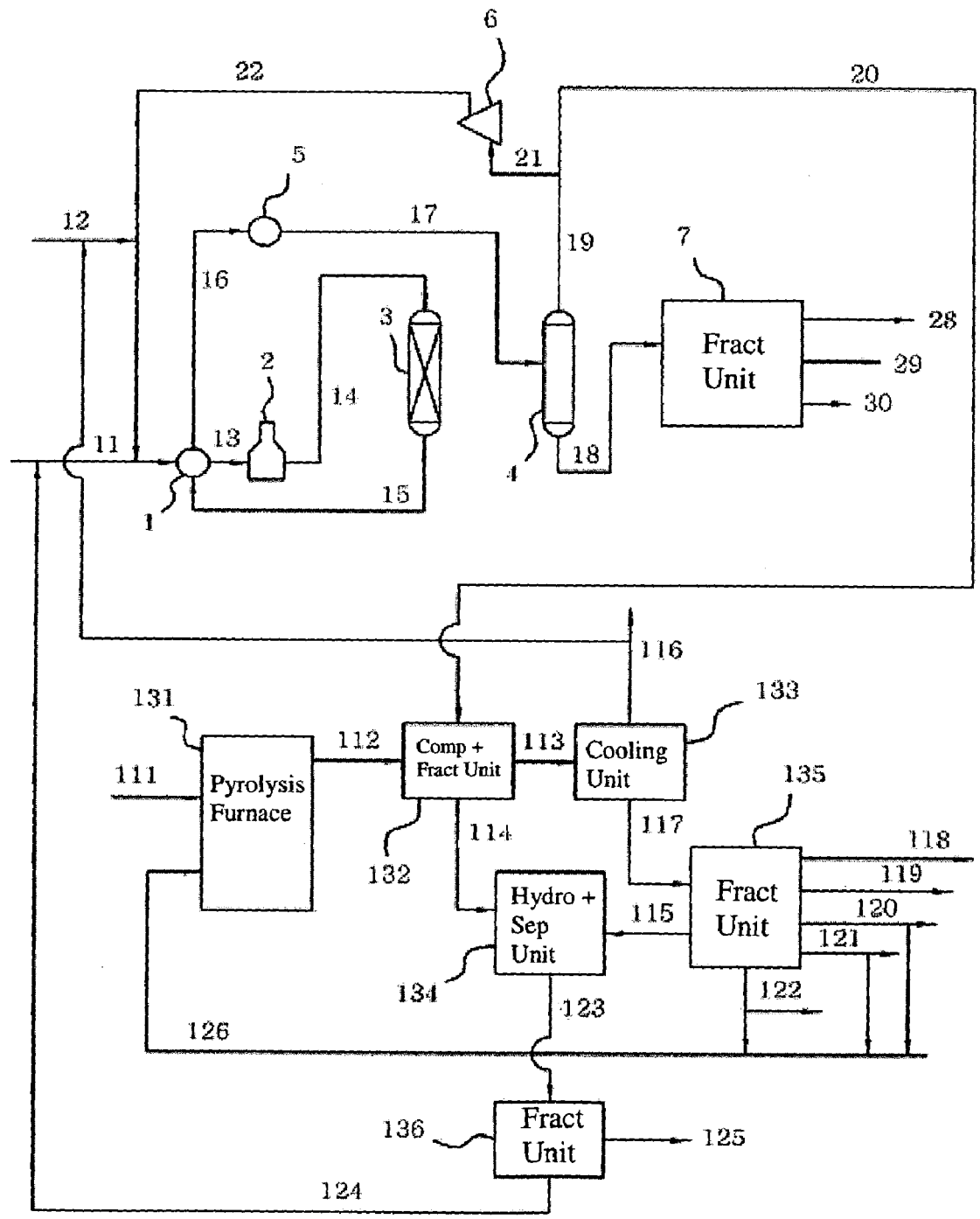
FIG. 1 illustrates one embodiment of a process of increasing the production of light olefin hydrocarbons from a hydrocarbon feedstock, according to the present invention.

Hereinafter, a detailed description will be given of the present invention, referring to the drawings.

Figure 2:
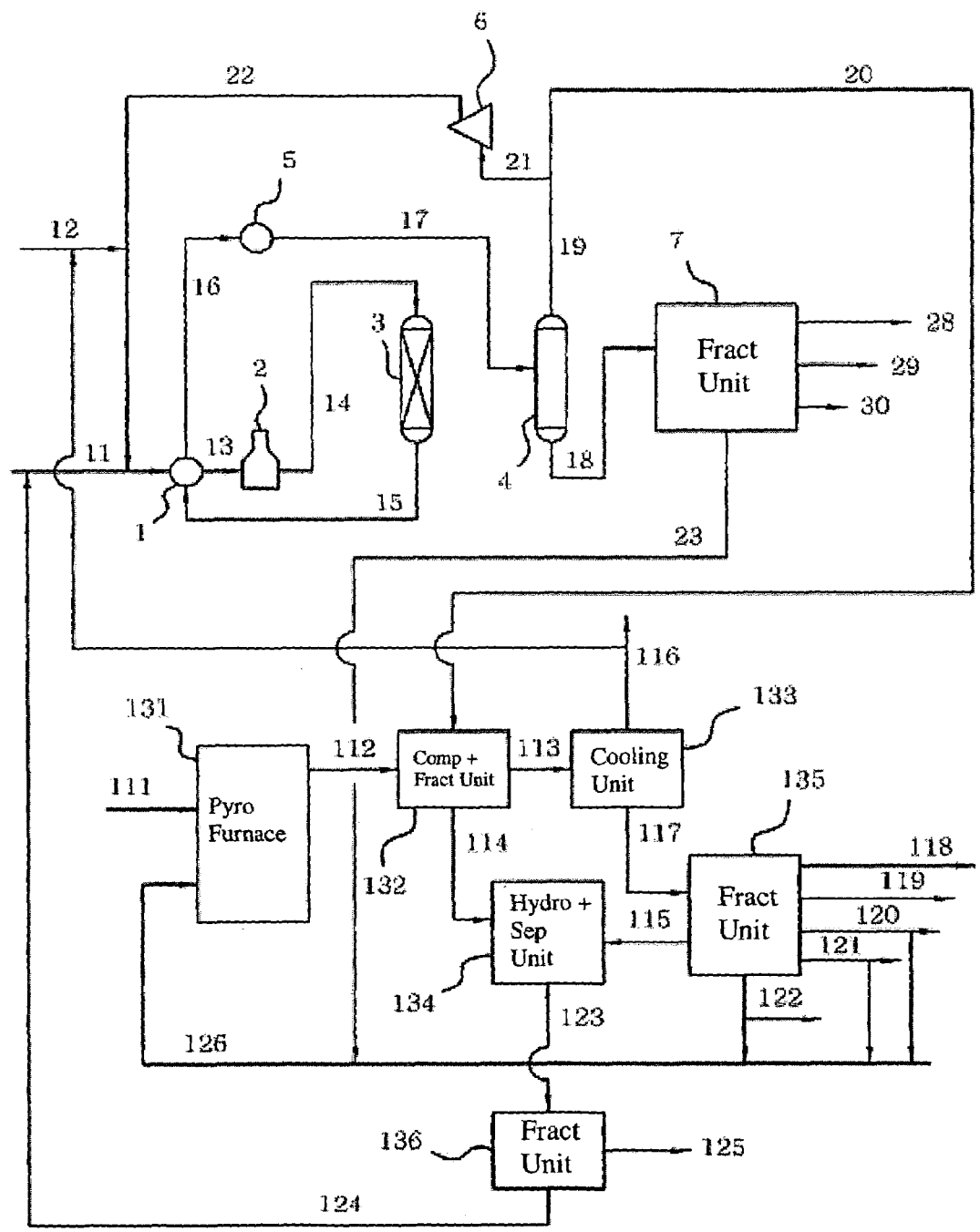
FIG. 2 illustrates another embodiment of a process of increasing the production of light olefin hydrocarbons from a hydrocarbon feedstock according to the present invention.
Figure 3:
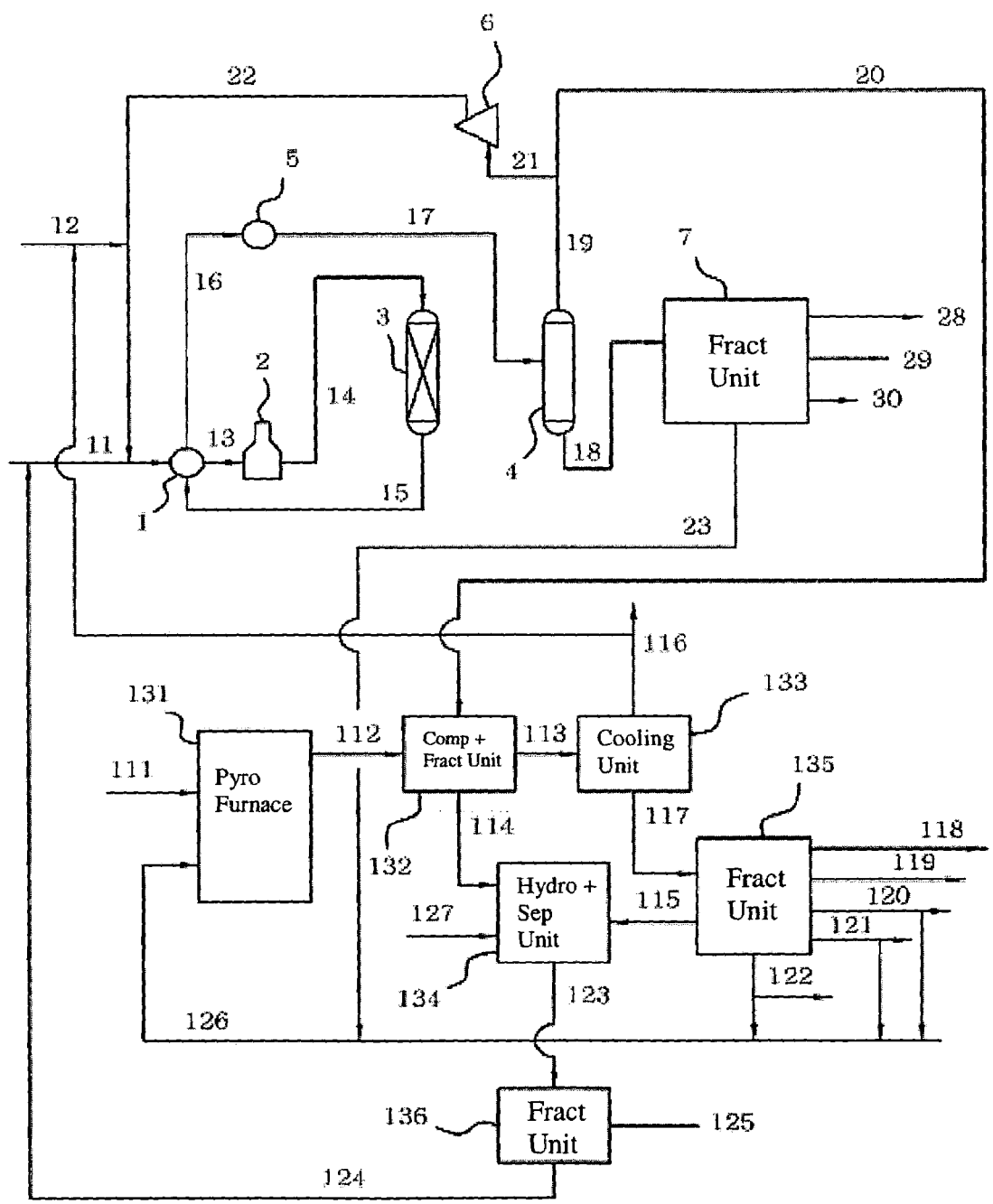
FIG. 3 illustrates still another embodiment of a process of increasing the production of light olefin hydrocarbons from a hydrocarbon feedstock, according to the present invention.

FIGS. 1 to 3 illustrate processes of increasing the production of light olefin hydrocarbons from a hydrocarbon feedstock, according to embodiments of the present invention.

With reference to FIGS. 1 to 3, a hydrocarbon feedstock fraction 111, such as naphtha, which is used as a feedstock of a pyrolysis process, is fed into a pyrolysis furnace 131 and then converted into light gas components 112 through a pyrolysis reaction in the presence of steam. The components 112 are fed into a compression and fractionation unit 132.

The hydrocarbon feedstock used in the present invention preferably includes hydrocarbons having a boiling point of 30-250° C., and may be selected from the group consisting of reformate, pyrolysis gasoline, fluidized catalytic cracking gasoline, $C_9+$ aromatic-containing mixture, naphtha, and mixtures thereof.

Hydrogen and light hydrocarbons 113 which are separated by the compression and fractionation unit 132 are fed into a cooling unit 133, and hydrogen 116 and hydrocarbons 117 are separated from each other therein. Meanwhile, separated hydrocarbons 117 are fed into a fractionation unit 135 at a rear stage to separate ethylene 118 and propylene 119, which are main products of the pyrolysis process, from ethane 120, propane 121, butane 122, and a $C_5$ fraction 115. In connection with this, ethane 120, propane 121, and butane 122, which are produced from the fractionation unit 135, are completely or partially recycled into the pyrolysis furnace 131 so that they are used as a feedstock 126 of the pyrolysis reaction, thereby the yield of ethylene 118 and propylene 119, which are main products of the pyrolysis furnace, is increased.

Meanwhile, heavy hydrocarbons ($C_5+$) 114, which are separated by the compression and fractionation unit 132, are fed into a hydrogenation and separation unit 134 in conjunction with hydrocarbons ($C_5+$) 115, which are supplied from the fractionation unit 135, to form hydrocarbons 123 in which sulfur compounds are converted and thus removed. The resulting hydrocarbons 123 are fed into a fractionation unit 136 at a rear stage, and then separated into pyrolysis gasolines 124 and a fraction 125 containing $C_9+$ hydrocarbons.

Meanwhile, the separated pyrolysis gasolines 124 are used as a reaction feedstock component in a process for producing an aromatic hydrocarbon mixture and liquefied petroleum gas (LPG) from a hydrocarbon mixture.

That is to say, the pyrolysis gasolines 124 are mixed with a hydrocarbon feedstock 11, hydrogen 22 and highly pure hydrogen 12, 116, and fed as feedstock oil into a reactor 3.

In connection with this, a separate heater 2 is provided in order to increase the temperature of a hydrogen/feedstock mixture to a reaction temperature. The hydrogen/feedstock mixture is heated to some extent 13 through heat exchange with reaction products 15 which are discharged from the reactor 3 and then fed into a heat exchanger 1, and then fed into the heater 2.

The hydrogen/feedstock mixture 14 which is fed into the reactor 3 is subjected to dealkylation, transalkylation, and hydrogenation reactions in the presence of a catalyst.

That is to say, a hydrocracking reaction of non-aromatic hydrocarbon compounds, and the dealkylation and transalkylation reactions of aromatic hydrocarbon compounds are simultaneously carried out in the reactor 3 to produce main basic petrochemical materials, such as benzene, toluene, and xylene, and byproducts, such as LPG and non-aromatic compounds.

In connection with this, the catalyst, which is packed in the reactor 3 to cause the dealkylation, transalkylation, and hydrogenation reactions, is not limited as long as it is known to those skilled in the art, and, preferably, may be a catalyst disclosed in U.S. Pat. No. 6,635,792.

That is to say, 10-95 wt % zeolite, which is at least one selected from the group consisting of mordenite, a beta type of zeolite, and a ZSM-5 type of zeolite and which has a silica/alumina molar ratio of 200 or less, is mixed with 5-90 wt % inorganic binder to produce a support, and platinum/tin or platinum/lead is supported on the mixture support, thereby the catalyst is created.

Meanwhile, the products 15 are present in a gaseous form at a relatively high temperature after the reactions are finished, are recycled into the heat exchanger 1 before they are fed into a gas-liquid separator 4, emit heat to the hydrogen/feedstock mixture therein, and fed into a cooler 5.

A product stream 17 passing through the cooler 5 is fed into the gas-liquid separator 4 at about 30-50° C., and then separated into a gaseous component and a liquid component. The gaseous component is discharged in an overhead stream 19 from the gas-liquid separator 4, and the liquid component is discharged in a bottom stream 18 therefrom. In connection with this, the gaseous component 19 includes about 60-75 mol % hydrogen and 25-40 mol % hydrocarbon components, and the hydrocarbon components include methane, ethane, and LPG, which have relatively small numbers of carbon atoms.

The overhead stream 19 is fed into the compression and fractionation unit 132 of the pyrolysis process, thereby being recycled 20. In connection with this, a portion 21 of the overhead stream 19 is separated, compressed by a compressor 6, mixed with highly pure hydrogen 12, 116 which is fed to control the purity of hydrogen, and fed in conjunction with the feedstock 11 into a reaction area. Alternatively, the entire overhead stream 20 is fed into the compression and fractionation unit 132. Particularly, if the entire overhead steam 20 is fed and recycled into the compression and fractionation unit 132 of the pyrolysis process, it is unnecessary to provide the compressor 6.

Meanwhile, the liquid component 18, which is discharged in the bottom stream 18 consists mostly of aromatic components, and also includes residual hydrogen and light non-aromatic components in a small amount. Accordingly, the liquid component 18 is additionally subjected to a separation and purification process, and is separated into a residual hydrogen and non-aromatic component stream, and benzene 28, toluene 29, xylene 30, and $C_9+$ aromatic compounds, which have purity of 99% or more, using a difference in boiling point in a fractionation unit 7.

Meanwhile, as shown in FIGS. 2 and 3, the residual hydrogen and non-aromatic component stream 23, which is separated by the fractionation unit 7, may be mixed with a $C_2$-$C_4$ paraffin hydrocarbon stream 126 which is recycled into the pyrolysis furnace 131, and then used as a feedstock of the pyrolysis furnace.

Particularly, if fluidized catalytic cracking gasolines 127 are used as a feedstock, as shown in FIG. 3, the fluidized catalytic cracking gasolines 127 are fed into the hydrogenation and fractionation unit 134 of the pyrolysis process to convert/remove sulfur and nitrogen compounds from the fluidized catalytic cracking gasolines 127 through a reaction, and then recycle into the process.

Conventionally, extra hydrogen is required in the typical hydrocracking reaction, and residual hydrogen is used as a fuel in the process. However, in the present invention, residual hydrogen is recycled into the compression and fractionation unit of the process of pyrolyzing hydrocarbons, so that recycled hydrogen is used in a corresponding amount to consumed hydrogen, and extra hydrogen is recovered, thereby improvement is achieved.

Furthermore, conventionally, the non-aromatic components which are rich in ethane and LPG components are used as a process fuel or are used to produce LPG products using an additional separation device. However, in the present invention, they are recycled into the compression and fractionation unit of the process of pyrolyzing hydrocarbons and an LPG separation device is provided in a pyrolysis device, thus it is possible to achieve improvement so that LPG is separated without the additional LPG separation device. As well, if the non-aromatic components which are rich in ethane and LPG components are recycled into the pyrolysis furnace and used as a feedstock of the pyrolysis furnace, the production of light olefin hydrocarbons, such as ethylene, which are main products of the pyrolysis furnace, is increased.

Additionally, gaseous products may be separated into ethane, propane, and butane through a separation device having a typical distillation column, or created in an ethane/propane/butane mixture state. Alternatively, they may be created while they contain hydrogen, and hydrogen may be recovered through an integrated process including the process for producing light olefin hydrocarbons, such as the pyrolysis process. Furthermore, there is an advantage in that, if the gaseous products are obtained in the ethane/propane/butane mixture form or as separate components and are completely or partially used as the feedstock of the pyrolysis furnace, it is possible to increase the production of light olefin hydrocarbons in the pyrolysis process.

A better understanding of the present invention may be obtained through the following examples and comparative examples which are set forth to illustrate, but are not to be construed as the limit of the present invention.

EXAMPLE 1

(A) In the course of molding a mixture support using a mordenite having a silica/alumina molar ratio of 20 and gamma-alumina as a binder, $H_2PtCl_6$ aqueous solution and $SnCl_2$ aqueous solution were mixed with each other, and the mordenite content of the support other than platinum and tin was controlled to 75 wt %. Platinum and tin were supported on an amount of 0.05 parts and 0.5 parts based on the total amount, 100 parts by weight, of mordenite and binder, molding was conducted so that the diameter was 1.5 mm and the length was 10 mm, drying was conducted at 200° C. for 12 hours, and firing was conducted at 500° C. for 4 hours, thereby a catalyst was created.

The catalyst which was created through the above procedure was tested for a process for producing an aromatic hydrocarbon mixture and LPG from a hydrocarbon mixture. Test conditions and the results are described in the following Table 1.

TABLE 1

| Feedstock | | Operation condition | | | Result | |
|---|---|---|---|---|---|---|
| Flow rate | Composition (wt %) | Reaction Temp. | Reaction pressure | $H_2$/H.C. molar ratio | Product (kg/hr) | Composition (wt %) |
| 10 kg/hr | $C_6$ paraffin 4.48 | 340° C. | 30 kg/cm$^2$g | 4 | Benzene 1.93 | $C_1$ paraffin 0.47 |
| | $C_7$ paraffin 2.58 | | | | Toluene 3.71 | $C_2$ paraffin 7.37 |
| | $C_8$ paraffin 0.9 | | | | Xylene 2.18 | $C_3$ paraffin 6.23 |
| | $C_9$ paraffin 0.27 | | | | Total 7.82 | $C_4$ paraffin 3.04 |
| | $C_{10}$+ paraffin 1.85 | | | | | $C_5$ paraffin 0.85 |
| | $C_5$ naphthene 2 | | | | | $C_6$ paraffin 0.11 |
| | $C_6$ naphthene 4.16 | | | | | $C_7$ paraffin 0.02 |
| | $C_7$ naphthene 0.61 | | | | | $C_8$ paraffin 0.02 |
| | $C_8$ naphthene 0.47 | | | | | $C_9$ paraffin 0.02 |
| | Benzene 42.4 | | | | | $C_6$ paraffin 0.02 |
| | Toluene 20.85 | | | | | $C_7$ paraffin 0.03 |
| | Ethyl benzene 6.76 | | | | | Benzene 19.31 |
| | Xylene 7.3 | | | | | Toluene 37.05 |
| | $C_9$+ aromatics 5.37 | | | | | Xylene 21.84 |
| | | | | | | $C_9$+ aromatics 5.64 |

(B) In the case that a process for producing an aromatic hydrocarbon mixture and LPG from a hydrocarbon mixture and a pyrolysis process are integrated according to the present invention, when a fraction which is produced in the integrated process and is rich in ethane and LPG components is used as a feedstock of the pyrolysis process, it is necessary to confirm pyrolysis performance of a pyrolysis furnace. In the following examples, the test conditions of the pyrolysis furnace and the results are described in the following Table 2, so that the effect of the test conditions on the pyrolysis furnace is better understood.

A test was conducted so that ethane produced according to process (A) was used as a feedstock in a pyrolysis furnace under operation conditions in which the weight ratio of steam to hydrocarbons was 0.3, the pyrolysis temperature was 852° C., pressure was 0.8 kg/cm$^2$ g, and the retention time was 0.172 sec. The test conditions and the results are described in the following Table 2.

EXAMPLE 2

A test was conducted so that propane produced according to example 1 (A) was used as a feedstock in a pyrolysis furnace under operation conditions in which the weight ratio of steam to hydrocarbons was 0.35, the pyrolysis temperature was 855° C., pressure was 0.8 kg/cm$^2$ g, and the retention time was 0.18 sec. The test conditions and the results are described in the following Table 2.

EXAMPLE 3

A test was conducted so that butane produced according to example 1 (A) was used as a feedstock in a pyrolysis furnace under operation conditions in which the weight ratio of steam to hydrocarbons was 0.5, the pyrolysis temperature was 860° C., pressure was 0.8 kg/cm$^2$ g, and the retention time was 0.154 sec. The test conditions and the results are described in the following Table 2.

EXAMPLE 4

A test was conducted so that a mixture of $C_2$, $C_3$, and $C_4$ produced according to example 1 (A) was used as a feedstock in a pyrolysis furnace under operation conditions in which the weight ratio of steam to hydrocarbons was 0.35, the pyrolysis temperature was 860° C., pressure was 0.8 kg/cm$^2$ g, and the retention time was 0.173 sec. The test conditions and the results are described in the following Table 2.

Comparative Example 1

A test was conducted so that light naphthas having a boiling point of 35-130° C. were used as a feedstock in a pyrolysis furnace under operation conditions in which the weight ratio of steam to hydrocarbons was 0.5, the pyrolysis temperature was 855° C., pressure was 0.8 kg/cm$^2$ g, and the retention time was 0.152 sec. The test conditions and the results are described in the following Table 2.

As described above, in the present invention, a process for producing an aromatic hydrocarbon mixture and LPG from a hydrocarbon mixture and a process for producing a hydrocarbon feedstock capable of being used as a feedstock in the former process are integrated. Thus, there are advantages in that it is possible to reduce the amount of hydrogen used in the process, the use of a compressor may be unnecessary depending on the type of process, and, if a separation device of a pyrolysis process has a surplus space, it is possible to separate LPG without an additional LPG separation device, resulting in excellent economic efficiency.

Furthermore, LPG and ethane components, which are separated in the process for producing the aromatic hydrocarbon mixture and the LPG from the hydrocarbon mixture, are used as a feedstock of the pyrolysis process, thus it is possible to improve the productivity of light olefin hydrocarbons, particularly ethylene, in a pyrolysis furnace.

As well, if excess LPG is exported or used as a fuel of a process, the process is integrated with a feedstock supplying process while it is not independently used, thus it is possible to increase the utility of a non-aromatic carbon compound which is rich in LPG and produced using a catalytic reaction and reduce the amount of hydrogen used, thereby it is possible to improve the productivity and efficiency of the two processes which are integrated.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the

TABLE 2

| Feedstock | Exam. 1<br>Ethane 100% | Exam. 2<br>Propane 100% | Exam. 3<br>Butane 100% | Exam. 4<br>Ethane 28.7%<br>Propane 48.2%<br>Butane 23.1% | Co. Ex. 1<br>b.p. 35–130° C. |
|---|---|---|---|---|---|
| Operation condition | | | | | |
| Pyrolysis temp., ° C. | 852 | 855 | 860 | 860 | 855 |
| Pressure, kg/cm$^2$g | 0.80 | 0.80 | 0.80 | 0.80 | 0.80 |
| Retention time, sec | 0.172 | 0.180 | 0.154 | 0.173 | 0.152 |
| Steam weight ratio | 0.30 | 0.35 | 0.50 | 0.35 | 0.50 |
| Results (wt %) | | | | | |
| $H_2$ | 4.11 | 1.54 | 1.14 | 1.86 | 0.99 |
| $CH_4$ | 3.41 | 20.07 | 19.29 | 17.36 | 15.80 |
| $C_2H_2$ | 0.57 | 0.62 | 0.66 | 0.69 | 0.60 |
| $C_2H_4$ | 51.50 | 34.85 | 25.53 | 38.32 | 30.37 |
| $C_2H_6$ | 35.62 | 2.91 | 2.38 | 14.48 | 3.17 |
| MAPD | 0.03 | 0.58 | 1.55 | 0.58 | 0.96 |
| $C_3H_6$ | 1.10 | 16.61 | 19.97 | 11.15 | 17.31 |
| $C_3H_8$ | 0.18 | 15.86 | 0.27 | 6.59 | 0.41 |
| $C_4$TOT | 1.83 | 3.64 | 22.65 | 5.33 | 11.64 |
| BTX | 0.94 | 1.68 | 3.24 | 1.96 | 8.55 |
| Others | 0.71 | 1.64 | 3.32 | 1.68 | 10.20 |

As shown in the above Table 2, when using an integrated process which is obtained by integrating a process for producing an aromatic hydrocarbon mixture and LPG from a hydrocarbon mixture and a process for producing a hydrocarbon feedstock capable of being used as a feedstock in the former process according to the present invention, it is possible to significantly improve the productivity of light olefin hydrocarbons, particularly ethylene, in a pyrolysis furnace.

appended claims, the invention may be practiced otherwise than as specifically described.

What is claimed is:
1. A process for increasing production of a light olefin hydrocarbon compound from a hydrocarbon feedstock, comprising the following steps of:
    feeding a hydrocarbon feedstock into a pyrolysis furnace to conduct a pyrolysis reaction;

separating reaction products, which are generated from the pyrolysis reaction, into a stream containing hydrogen and $C_4$ or lower hydrocarbons, and a stream containing $C_5+$ hydrocarbons, through a compression and fractionation process;

recovering hydrogen, and $C_2$, $C_3$ and $C_4$ olefin and paraffin hydrocarbons, respectively from the stream containing hydrogen and $C_4$ or lower hydrocarbons;

separating pyrolysis gasolines and a $C_9+$ hydrocarbon-containing fraction from the stream containing $C_5+$ hydrocarbons, using hydrogenation and separation processes;

feeding a mixture of the separated pyrolysis gasolines, a hydrocarbon feedstock, and hydrogen into at least one reaction area;

converting the mixture in the presence of a catalyst in the reaction area into an aromatic hydrocarbon compound which is rich in benzene, toluene, and xylene through dealkylation/transalkylation reactions, and into a non-aromatic hydrocarbon compound which is rich in liquefied petroleum gas through a hydrocracking reaction;

separating reaction products of the mixture converting step into an overhead stream, which contains hydrogen, methane, ethane, and liquefied petroleum gas, and a bottom stream, which contains aromatic hydrocarbon compounds, and a small amount of hydrogen and non-aromatic hydrocarbon compounds, using a gas-liquid separation process;

circulating the overhead stream into the compression and fractionation process; and recovering the aromatic hydrocarbon compounds from the bottom stream.

2. The process as set forth in claim 1, further comprising the step of circulating at least a portion of the $C_2$-$C_4$ paraffin hydrocarbons which are respectively recovered in the hydrogen and $C_4$ or low hydrocarbon recovering step into the pyrolysis furnace.

3. The process as set forth in claim 1, wherein, in the overhead steam circulating step, a portion of the overhead stream is separated and then recycled into the reaction area of the hydrocarbon feedstock converting step, or the entire overhead stream is recycled into the compression and fractionation process.

4. The process as set forth in claim 1, further comprising the step of separating the aromatic hydrocarbon compounds which are recovered in the aromatic hydrocarbon recovering step into benzene, toluene, xylene, and $C_9+$ aromatic compounds, respectively.

5. The process as set forth in claim 1, wherein 10-95 wt % zeolite, which is at least one selected from a group consisting of mordenite, a beta type of zeolite, and a ZSM-5 type of zeolite and which has a silica/alumina molar ratio of 200 or less, is mixed with 5-90 wt % inorganic binder to produce a support, and platinum/tin or platinum/lead is supported on the mixture support to produce the catalyst.

6. The process as set forth in claim 1, wherein the hydrocarbon feedstock is selected from a group consisting of reformate, pyrolysis gasoline, fluidized catalytic cracking gasoline, $C_9+$ aromatic-containing mixture, naphtha, and a mixture thereof.

7. A process for increasing production of a light olefin hydrocarbon compound from a hydrocarbon feedstock, comprising the following steps of:

feeding a hydrocarbon feedstock into a pyrolysis furnace to conduct a pyrolysis reaction;

separating reaction products, which are generated from the pyrolysis reaction, into a stream containing hydrogen and $C_4$ or lower hydrocarbons, and a stream containing $C_5+$ hydrocarbons, through a compression and fractionation process;

recovering hydrogen, and $C_2$, $C_3$ and $C_4$ olefin and paraffin hydrocarbons from the stream containing hydrogen and $C_4$ or lower hydrocarbons;

separating pyrolysis gasolines and a $C_9+$ hydrocarbon-containing fraction from the stream containing $C_5+$ hydrocarbons, using hydrogenation and separation processes;

feeding a mixture of the separated pyrolysis gasolines, a hydrocarbon feedstock, and hydrogen into at least one reaction area;

converting the mixture in the presence of a catalyst in the reaction area into an aromatic hydrocarbon compound which is rich in benzene, toluene, and xylene through dealkylation/transalkylation reactions, and into a non-aromatic hydrocarbon compound which is rich in liquefied petroleum gas through a hydrocracking reaction;

separating reaction products of the mixture converting step into an overhead stream, which contains hydrogen, methane, ethane, and liquefied petroleum gas, and a bottom stream, which contains aromatic hydrocarbon compounds, and a small amount of hydrogen and non-aromatic hydrocarbon compounds, using a gas-liquid separation process;

circulating the overhead stream into the compression and fractionation process;

separating the bottom stream into a stream containing the aromatic hydrocarbon compounds and a stream containing a small amount of hydrogen and non-aromatic hydrocarbon compounds; and circulating the stream, which is separated in the bottom stream separating step and contains a small amount of hydrogen and non-aromatic hydrocarbon compounds, into the pyrolysis furnace.

8. The process as set forth in claim 7, further comprising the step of circulating at least a portion of the $C_2$-$C_4$ paraffin hydrocarbons which are respectively recovered in the hydrogen and $C_4$ or lower hydrocarbon recovering step into the pyrolysis furnace.

9. The process as set forth in claim 7, wherein, in the overhead stream circulating step, a portion of the overhead stream is separated and then recycled into the reaction area of the hydrocarbon feedstock converting step, or the entire overhead stream is recycled into the compression and fractionation process.

10. The process as set forth in claim 7, wherein 10-95 wt % zeolite, which is at least one selected from a group consisting of mordenite, a beta type of zeolite, and a ZSM-5 type of zeolite, and which has a silica/alumina molar ratio of 200 or less, is mixed with 5-90 wt % inorganic binder to produce a support, and platinum/tin or platinum/lead is supported on the mixture support to produce the catalyst.

11. The process as set forth in claim 7, wherein the hydrocarbon feedstock is selected from a group consisting of reformate, pyrolysis gasoline, fluidized catalytic cracking gasoline, $C_9+$ aromatic-containing mixture, naphtha, and a mixture thereof.

12. A process for increasing production of a light olefin hydrocarbon compound from a hydrocarbon feedstock, comprising the following steps of:

feeding a hydrocarbon feedstock into a pyrolysis furnace to conduct a pyrolysis reaction;

separating reaction products, which are generated from the pyrolysis reaction, into a stream containing hydrogen and $C_4$ or lower hydrocarbons, and a stream containing $C_5+$ hydrocarbons, through a compression and fractionation process;

recovering hydrogen, and $C_2$, $C_3$ and $C_4$ olefin and paraffin hydrocarbons from the stream containing hydrogen and $C_4$ or lower hydrocarbons;

introducing fluidized catalytic cracking gasolines to the stream containing $C_5+$ hydrocarbons, and separating pyrolysis gasolines and a $C_9+$ hydrocarbon-containing fraction from the resulting stream using hydrogenation and separation processes;

feeding a mixture of the separated pyrolysis gasolines, a hydrocarbon feedstock, and hydrogen into at least one reaction area;

converting the mixture in the presence of a catalyst in the reaction area into an aromatic hydrocarbon compound which is rich in benzene, toluene, and xylene through dealkylation/transalkylation reactions, and into a non-aromatic hydrocarbon compound which is rich in liquefied petroleum gas through a hydrocracking reaction;

separating reaction products of the mixture converting step into an overhead stream, which contains hydrogen, methane, ethane, and liquefied petroleum gas, and a bottom stream, which contains aromatic hydrocarbon compounds, and a small amount of hydrogen and non-aromatic hydrocarbon compounds, using a gas-liquid separation process;

circulating the overhead stream into the compression and fractionation process;

separating the bottom stream into a stream containing the aromatic hydrocarbon compounds and a stream containing a small amount of hydrogen and non-aromatic hydrocarbon compounds; and circulating the stream, which is separated in the bottom stream separating step and contains a small amount of hydrogen and non-aromatic hydrocarbon compounds, into the pyrolysis furnace.

13. The process as set forth in claim 12, further comprising the step of circulating at least a portion of the $C_2$-$C_4$ paraffin hydrocarbons which are respectively recovered in the hydrogen and $C_4$ or lower hydrocarbon recovering step into the pyrolysis furnace.

14. The process as set forth in claim 12, wherein, in the overhead stream circulating step, a portion of the overhead stream is separated and then recycled into the reaction area of the hydrocarbon feedstock converting step, or the entire overhead stream is recycled into the compression and fractionation process.

15. The process as set forth in claim 12, wherein 10-95 wt % zeolite, which is at least one selected from a group consisting of mordenite, a beta type of zeolite, and a ZSM-5 type of zeolite and which has a silica/alumina molar ratio of 200 or less, is mixed with 5-90 wt % inorganic binder to produce a support, and platinum/tin or platinum/lead is supported on the mixture support to produce the catalyst.

16. The process as set forth in claim 12, wherein the hydrocarbon feedstock is selected from a group consisting of reformate, pyrolysis gasoline, fluidized catalytic cracking gasoline, $C_9+$ aromatic-containing mixture, naphtha, and a mixture thereof.

* * * * *